United States Patent Office 3,131,006
Patented Apr. 28, 1964

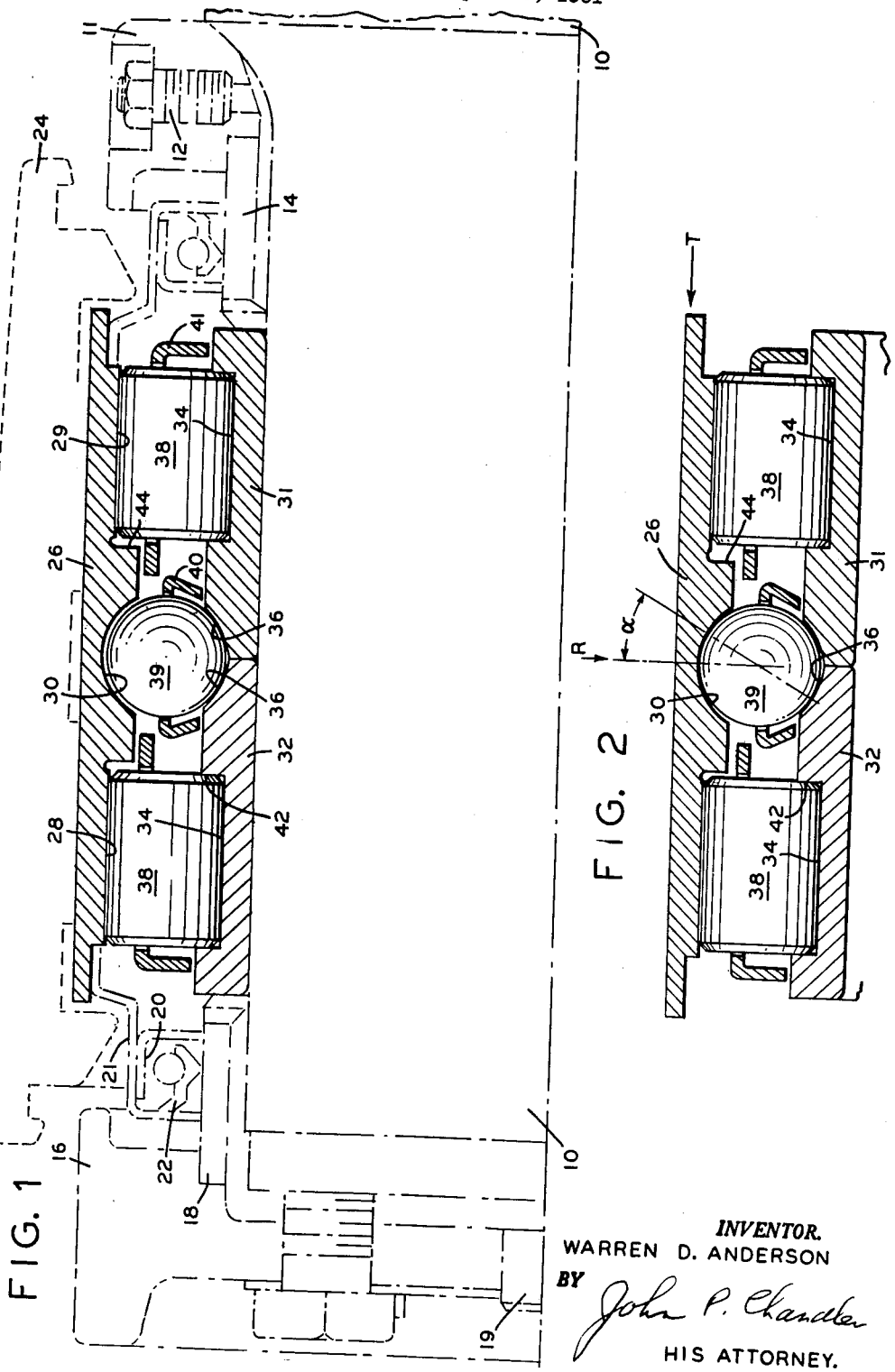

3,131,006
JOURNAL BEARING
Warren D. Anderson, Stamford, Conn., assignor, by mesne assignments, to American Brake Shoe Company, New York, N.Y., a corporation of Delaware
Filed Sept. 13, 1961, Ser. No. 137,886
2 Claims. (Cl. 308—174)

This invention relates to bearings primarily for railroad freight cars and employing a combination of cylindrical rollers and balls as the anti-friction elements, and relates more particularly to an improved bearing having superior operating characteristics and greater durability than the roller bearings most commonly in use.

Any new and improved freight car bearing, to be suitable for general adoption and use, must have envelope dimensions which are compatible with the dimensions established by the American Association of Railroads for standard freight car journals, adapters and side frames.

Tapered roller bearings as frequently used in railway service have the limitation that both radial and thrust loads result in thrust components which force the large end of the roller against the guide flange of the inner ring. This results in excessive frictional heat and wear and under conditions of marginal lubrication the bearing will fail due to scuffing and abrasion of the roller ends and the guide flange.

In railway bearings using cylindrical rollers with the thrust load carried directly on the flat ends of the rollers, there is also excessive frictional heat and wear, and sensitivity to lubrication.

The principal object of the present invention is to provide a superior bearing having maximum radial and thrust load capacity within a given envelope, with all components of the radial and thrust loads being carried by pure rolling contact.

A further object of the invention is to provide a bearing which is simple and economical to manufacture.

A further object is to provide a bearing which will have maximum reliability and safety even under abnormal conditions of operation.

In the drawings:

FIG. 1 is a vertical section taken through the upper half of a bearing embodying the present invention.

FIG. 2 is a fragmentary view showing the relation of the parts under conditions of radial load plus a heavy thrust load.

FIG. 1 shows the bearing of the present invention in solid lines and the associated conventional mounting parts are shown by broken outline. These conventional parts are the axle journal 10, backing ring 11 with lubricant fitting 12 and seal wear ring 14, end cap 16 with seal wear ring 18, and lubricant plug 19, seals 20, 21 and 22, and adapter 24 which transmits the radial and thrust loads from the freight car truck side frame to the outer ring 26 of the bearing.

The bearing of the present invention consists of the outer ring 26 formed in a single piece and having two roller raceways 28 and 29 adjacent to the ends of said outer ring, with a ball raceway 30 between the roller raceways. It also includes inner rings 31 and 32, mounted in abutting relation at their inner ends, each having a roller raceway 34 and a ball raceway 36. It further includes rollers 38 and balls 39 contained in the respective raceways. Separators 40 and 41 properly space the balls and rollers.

This arrangement allows use of the maximum diameter balls and rollers as opposed to designs in which the ball and roller races are separate members mounted in a common outer housing as shown in Pitt Patent No. 1,638,957 and Hilton Patent No. 2,470,071.

Also the use of two inner rings 31 and 32 allows use of the maximum number of balls and rollers, since in assembling the bearing one is not subject to the limitations of the eccentric method of assembly which would be necessary with one piece inner and outer rings.

The inner ring roller raceways have guide flanges 42 to guide the rollers. The outer ring roller races, however, have the surfaces 44 sufficiently removed from the end of the roller to prevent the rollers from carrying thrust loads at any time. Also the radial clearance between balls 39 and ball races 30 and 36 is greater than the radial clearance between rollers 38 and roller races 28—29 and 34—34 so that purely radial loads are carried only by the roller bearings. Moreover, this radial clearance in the ball bearing permits the balls to assume the position shown in FIG. 2, when the bearing is carrying a thrust load T. The angle of contact, $a$, is preferably about 25° or 30°, thus giving the bearing high thrust capacity. Also, with this contact angle, the contact area between balls 39 and inner ring raceway 36 is moved away from the relatively weak corner formed by the intersection of raceway 36 with the abutting face of the ring. In order to have the contact angle equal to about 25° or 30° as shown, it is, of course, necessary to have the radius of curvature of the raceways greater than the radius of the ball, as will be appreciated by those skilled in the art.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalency of the claims are intended to be included therein.

I claim:

1. An anti-friction bearing comprising an outer ring formed in a single piece and having an interior roller raceway adjacent each end thereof, and an interior ball raceway between said roller raceways, an inner ring formed in two sections arranged in abutting, end-to-end relation, each section having an exterior roller raceway with guide flanges and an exterior ball raceway intersecting the abutting faces, cylindrical rollers positioned in each of said roller raceways and balls positioned in said ball raceways, the several raceways being so proportioned relative to the balls and rollers as to provide a radial clearance between said balls and races which is greater than the radial clearance between said rollers and races, and the axial clearance between said balls and races is less than the axial clearance between said rollers and races.

2. An anti-friction bearing comprising an outer ring formed in a single piece and having an interior roller raceway adjacent each end thereof and an interior ball raceway between said roller raceways, an inner ring formed in two sections arranged in abutting, end-to-end relation, each section having an exterior roller raceway with guide flanges and an exterior ball raceway intersecting the abutting faces, cylindrical rollers positioned in each of said roller raceways and balls positioned in said ball raceways, said balls having a greater radial clearance and a smaller axial clearance in their raceways than the rollers.

References Cited in the file of this patent

UNITED STATES PATENTS

| | | |
|---|---|---|
| 1,638,957 | Pitt | Aug. 11, 1927 |
| 2,040,489 | Large | May 12, 1936 |
| 2,297,192 | Reed | Sept. 29, 1942 |
| 2,470,071 | Hilton | May 10, 1949 |
| 2,915,346 | Stallman | Dec. 1, 1959 |
| 2,962,328 | Benktander | Nov. 29, 1960 |

FOREIGN PATENTS

| | | |
|---|---|---|
| 435,364 | France | Dec. 22, 1911 |